(12) United States Patent
Lee

(10) Patent No.: US 8,011,640 B2
(45) Date of Patent: Sep. 6, 2011

(54) AIR VALVE ADJUSTING SWITCH ASSEMBLY

(75) Inventor: Yuan-Yung Lee, Taipei (TW)

(73) Assignee: Pacific Hospital Supply Co., Ltd., Taipei (TW)

( * ) Notice: Subject to any disclaimer, the term of this patent is extended or adjusted under 35 U.S.C. 154(b) by 679 days.

(21) Appl. No.: 12/128,829

(22) Filed: May 29, 2008

(65) Prior Publication Data

US 2009/0294714 A1    Dec. 3, 2009

(51) Int. Cl.
*F16K 5/10*    (2006.01)

(52) U.S. Cl. .................. 251/121; 251/205; 251/900

(58) Field of Classification Search .......... 251/121–122, 251/205, 900
See application file for complete search history.

(56) References Cited

U.S. PATENT DOCUMENTS

| | | | | |
|---|---|---|---|---|
| 3,145,733 A | * | 8/1964 | Shaw et al. | 137/583 |
| 4,121,619 A | * | 10/1978 | Pauliukonis | 137/469 |
| 4,418,888 A | * | 12/1983 | Jacobson et al. | 251/216 |
| 4,601,310 A | * | 7/1986 | Phillips | 137/556 |
| 4,926,898 A | * | 5/1990 | Sampey | 137/315.02 |
| 5,123,436 A | * | 6/1992 | Koechlein et al. | 137/12 |
| 5,794,823 A | * | 8/1998 | Roundtree | 222/400.7 |
| 7,458,558 B1 | * | 12/2008 | Toth | 251/145 |

* cited by examiner

*Primary Examiner* — John Bastianelli
(74) *Attorney, Agent, or Firm* — Roger H. Chu

(57) ABSTRACT

The present invention relates to an air valve, including a valve body, an air valve adjusting pipe, an adjusting bolt, an airtight ring and a screw cap. With the geometric shapes of the air valve adjusting pipe and the adjusting bolt, the airtight ring installed onto the adjusting bolt is in contact with the internal wall of the air valve adjusting pipe to achieve a totally airtight effect and adjusting the level of airtightness.

5 Claims, 2 Drawing Sheets

AIR VALVE ADJUSTING SWITCH ASSEMBLY

FIELD OF THE INVENTION

The present invention relates to an air valve adjusting switch assembly, and more particularly to an air valve adjusting switch assembly using an airtight ring to achieve a total airtightness or adjust the level of airtightness of an air valve switch.

BACKGROUND OF THE INVENTION

In general, an air valve is primarily used for restricting a gas from flowing into an air valve body. If a user wants to change the flow of the gas, the user simply needs to control an adjusting switch of the air valve. However, the gas may leak easily when the user turns the adjusting switch, due to a poor internal structure of the switch. As to the air valve switch used for controlling the flow of a dangerous gas such as petroleum gas, the issue of leakage becomes a safety concern.

To prevent the leakage of an air valve, manufacturers and designers generally adopt a complicated structure with many components for the prevention of leakage. For example, U.S. Pat. No. 5,349,984 discloses a check valve provided for preventing a leakage, and the check valve includes a spring and a valve component, such that an elastomeric apertured plug plugged into a position of the valve body for stopping a leak. In U.S. Pat. No. 4,681,132, a check valve with a preset cracking pressure is disclosed for preventing a leakage, and the check valve includes a valve element reciprocatally positioned within a valve body, and both of the valve body and the valve element including valve seats seal together when the valve element is urged forwardly within the valve body. A plug is positioned within the rear of the valve body to constantly urge the valve element forwardly, thereby defining a cracking pressure necessary to unseat the valve seats to allow the flow of fluid through the valve body.

Since the conventional design of valves usually comes with a complicated structure with many components, the maintenance, repair or replacement of components become difficult, if it is necessary to replace a component that is worn out after being used for a long time. Obviously, the structure of the conventional valve requires improvements.

SUMMARY OF THE INVENTION

The primary objective of the present invention is to overcome the shortcomings of the prior art by providing an air valve adjusting switch assembly. With the design and the geometric shape of an air valve adjusting pipe and an adjusting bolt, an airtight ring installed on an adjusting bolt is in contact with the internal wall of an air valve adjusting pipe for achieving a total airtightness effect or adjusting the level of airtightness.

Another objective of the present invention is to design an adjusting bolt with a conic structure, and a shoulder portion is disposed at a distal edge of the bottom of the conic structure, so that the adjusting bolt can be installed and connected to the air valve adjusting pipe, and shoulder portion is provided for latching into air valve adjusting pipe, so that the adjusting bolt will not be loosened or fallen out easily from the air valve adjusting pipe.

To achieve the foregoing objectives, the present invention provides an air valve adjusting switch assembly, comprising: a valve body, having an air flow passage, an air valve adjusting pipe installed on a lateral side of the valve body and vertically interconnected with the air valve adjusting pipe, and an internal side of the air valve adjusting pipe being coupled to a portion with a tapered-neck opening of the air flow passage; an adjusting bolt, installed in the air valve adjusting pipe, and having a front end extended into the air flow passage for adjusting the size of the air flow passage, and a conic structure formed on the adjusting bolt corresponding to a portion of the tapered-neck opening of the air valve adjusting pipe; a circular groove, concavely disposed on the conic structure of the adjusting bolt; an airtight ring, being an elastic ring sheathed onto the circular groove of the adjusting bolt, and attached closely with the tapered-neck opening; and a screw cap, rotatably installed at the top of the air valve adjusting pipe, for sealing the air valve adjusting pipe by the adjusting bolt.

To make it easier for our examiner to understand the objects, characteristics and advantages of the present invention, preferred embodiments and related drawings are used for the detailed description of the present invention as follows:

DETAILED DESCRIPTION

The present invention relates to an air valve adjusting switch assembly using an elastic airtight ring to achieve the airtight effect of an air valve switch, and preferred embodiments used for illustrating the invention are described as follows.

Figure 1:
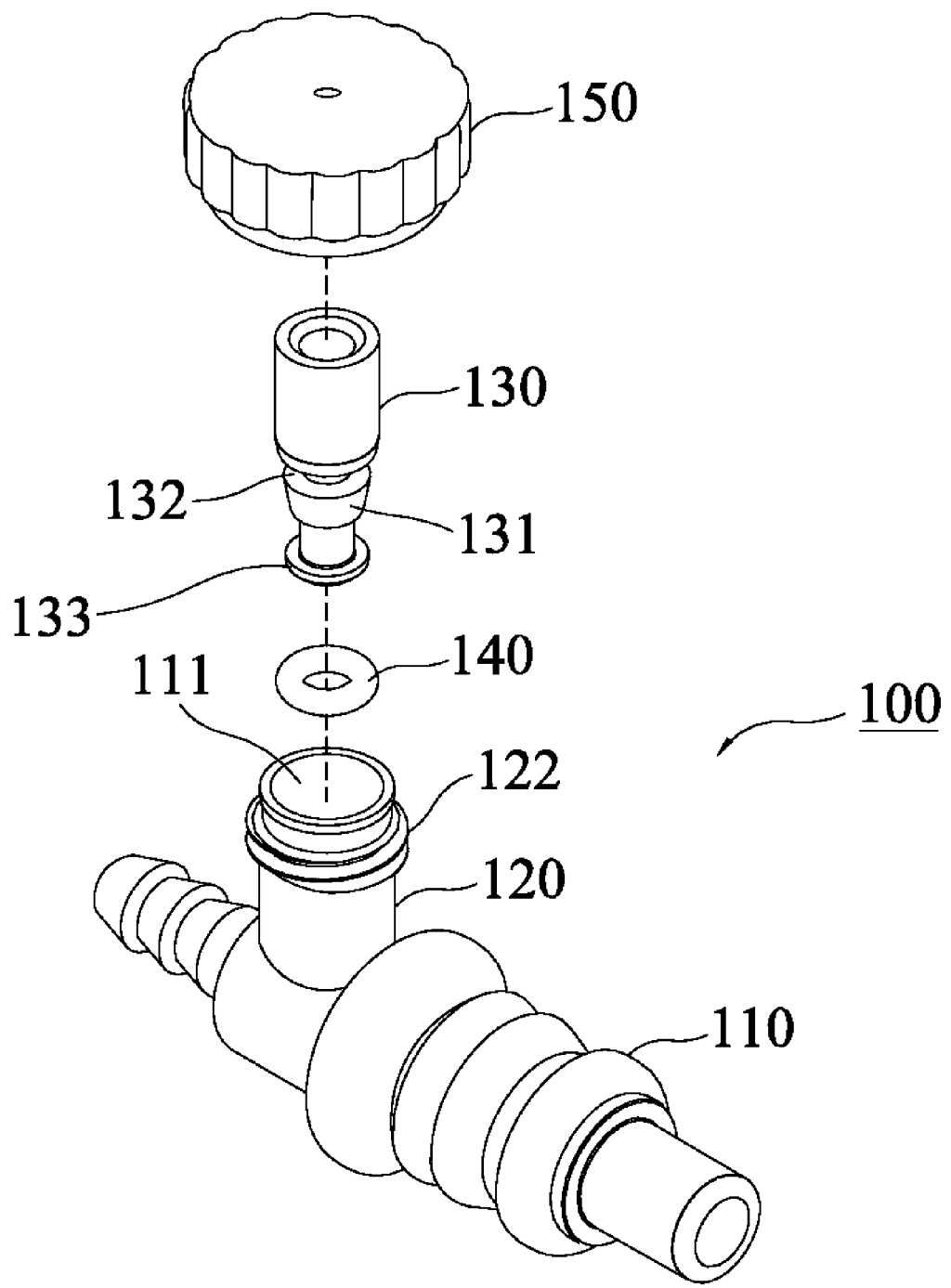
FIG. 1 is an exploded view of an air valve adjusting switch assembly in accordance with the present invention.

Referring to FIG. 1 for an exploded view of an air valve adjusting switch assembly in accordance with the present invention, the air valve adjusting switch assembly 100 comprises a valve body 110, an air valve adjusting pipe 120, an adjusting bolt 130, an airtight ring 140, and a screw cap 150. The valve body 110 includes an air flow passage 111, and the air valve adjusting pipe 120 is installed on a lateral side of the valve body 110 and vertically interconnected with the air flow passage 111. The internal side of the air valve adjusting pipe 120 is coupled with a portion of the air flow passage 111 having a tapered-neck opening 121, and a screw thread 122 is disposed on the external side of the top of a pipe opening of the air valve adjusting pipe 120. The adjusting bolt 130 is installed into the air valve adjusting pipe 120, and a front end of the adjusting bolt 130 is extended into the air flow passage 111 for adjusting the size of the air flow passage 111, and a conic structure 131 is formed at a portion of the adjusting bolt 130 corresponding to the tapered-neck opening 121 of the air valve adjusting pipe 120 for facilitating the conic structure 131 of the adjusting bolt 130 to be concavely disposed into a circular groove 132. The airtight ring 140 is an elastic ring such as a rubber ring, and the airtight ring 140 is sheathed onto the circular groove 132 of the adjusting bolt 130. With the elastic material of the airtight ring 140, the airtight ring 140 is attached closely with the tapered-neck opening 121 to achieve the airtight effect of the air valve adjusting pipe 120. The internal wall of the screw cap 150 has a plurality of thread teeth 151 rotatably engaged with the screw thread 122 at the pipe opening of the air valve adjusting pipe 120 and rotatably screwed to the top of the air valve adjusting pipe 120 for sealing the air valve adjusting pipe 120 by the adjusting bolt 130.

Figure 2:
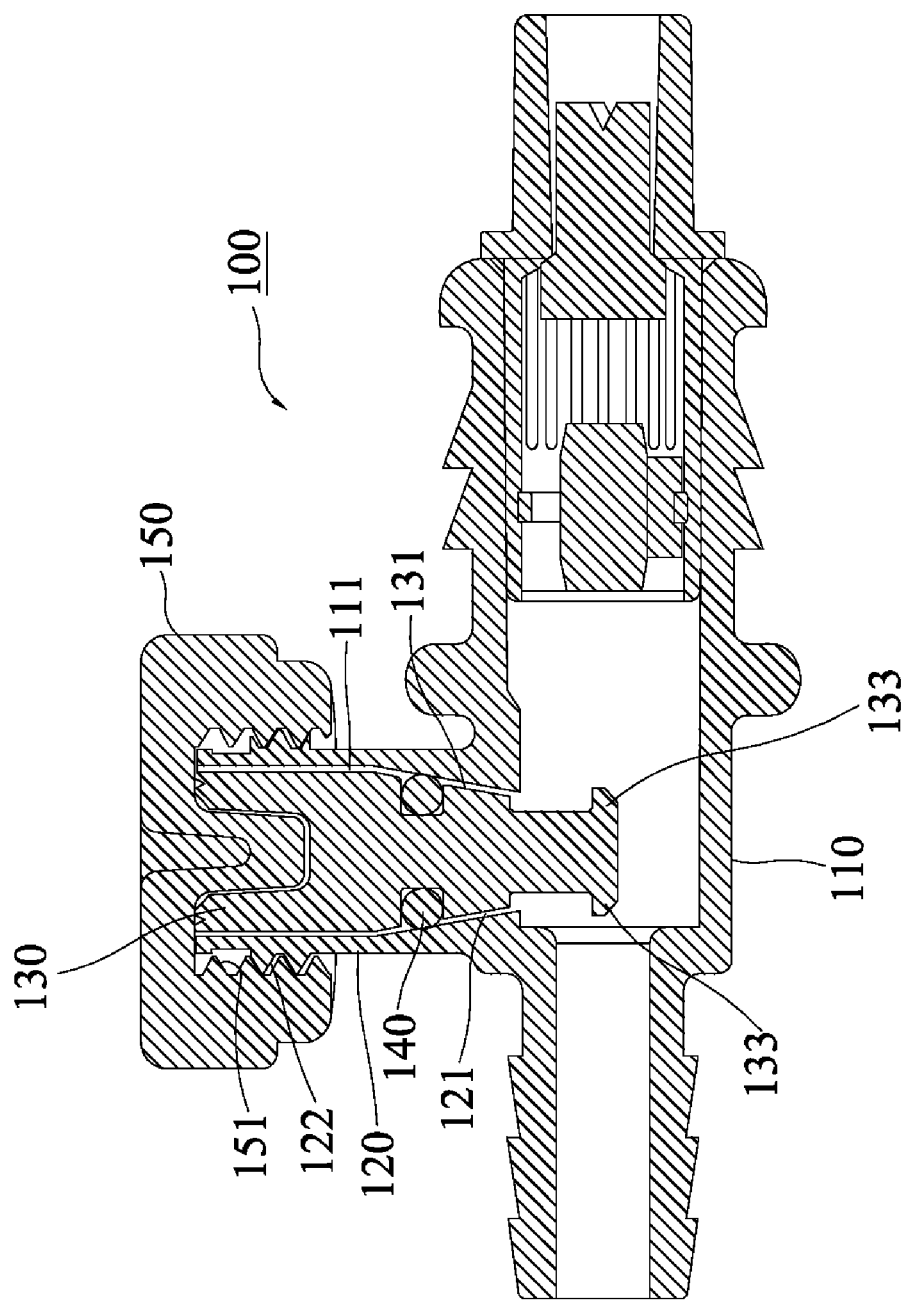
FIG. 2 is a cross-sectional view of an air valve adjusting switch assembly in accordance with the present invention.

Referring to FIG. 2 for a cross-sectional view of an air valve adjusting switch assembly in accordance with the present invention, the adjusting bolt 130 is installed into the air valve adjusting pipe 120, and the screw cap 150 is sealed onto the air valve adjusting pipe 120. In the meantime, the conic structure 131 at the front section of the adjusting bolt 130 is engaged with the tapered-neck opening 121 of the air valve adjusting pipe 120, so that the airtight ring 140 fixed onto the adjusting bolt 130 and concavely disposed in the circular groove 132 can be attached closely to the tapered-neck opening 121. If the screw cap 150 is screwed with the air valve adjusting pipe 120 to seal the air valve adjusting pipe 120 by the adjusting bolt 130, the airtight ring 140 will be squeezed by the tapered-neck opening 121 and the conic structure 131 to resume its original status, so as to achieve a total airtight effect of the air valve adjusting pipe 120.

To prevent the adjusting bolt 130 installed in the air valve adjusting pipe 120 from being loosened or pulled out easily, a shoulder portion 132 is designed at a distal edge at the bottom of the conic structure having the adjusting bolt 130, and the external diameter of the shoulder portion 132 is slightly greater than the hole diameter of the air flow passage 111, such that after the adjusting bolt 130 is installed to the air valve adjusting pipe 120, the shoulder portion 133 can be latched into the air valve adjusting pipe 120 to prevent the adjusting bolt 120 from loosened or pulled out easily from the air valve adjusting pipe. To facilitate the rotation and the adjustment of the screw cap 150, a rough surface is designed for the surface of an external periphery of the screw cap 150 for the slippery-resisting purpose. As shown in FIG. 1, the external periphery of the screw cap 150 comes with continuous wavy arc shaped protrusions to improve the friction for turning the screw cap 150.

By turning and screwing the screw cap 150 onto the pipe opening of the air valve adjusting pipe 120, users can seal the air valve adjusting pipe 120 and adjust the position of the adjusting bolt 130 in the air valve adjusting pipe 120, so as to adjust the size of the air flow passage 111. With the design of the airtight ring 140, the airtight effect of the air valve switch can be achieved, regardless of the size of the adjusting valve.

The present invention employs fewer components, and thus makes the maintenance and repair much easier. After the airtight ring 140 has been used for a while and becomes elastic exhausted, users simply need to turn and separate the screw cap 150 from the air valve adjusting pipe 120, and pull the adjusting bolt 130 out from the air valve adjusting pipe 120, and then replace the airtight ring 140 concavely fixed onto the circular groove 132 of the adjusting bolt 130 by a new airtight ring 140, and finally reinstall the adjusting bolt 130 and the screw cap 150 to their original positions to complete an easy and convenient replacement of components.

In summation of the above description, the present invention herein enhances the performance than the conventional structure and further complies with patent application requirements and is thus duly filed for patent application.

While the invention has been described by means of specific embodiments, numerous modifications and variations could be made thereto by those skilled in the art without departing from the scope and spirit of the invention set forth in the claims.

What is claimed is:

1. An air valve adjusting switch assembly, comprising:
a valve body, comprising:
an air flow passage; and
an air valve adjusting pipe, being installed on a lateral side of the valve body and vertically interconnected with the air flow passage, and having a screw thread disposed on an external side of the top of a pipe opening of the air valve adjusting pipe, moreover an internal side of the air valve adjusting pipe being coupled to a portion with a tapered-neck opening of the air flow passage;
an adjusting bolt, being installed in the air valve adjusting pipe, and having a front end extended into the air flow passage for adjusting the size of the air flow passage, and a conic structure formed on the adjusting bolt corresponding to a portion of the tapered-neck opening of the air valve adjusting pipe;
a circular groove, being concavely disposed on the conic structure of the adjusting bolt;
an airtight ring, being an elastic ring sheathed onto the circular groove of the adjusting bolt, and attached tightly with the tapered-neck opening;
a screw cap, being rotatably installed at the top of the air valve adjusting pipe, having a plurality of thread teeth disposed on an internal wall of the screw cap for rotatably engaging with the screw thread of the pipe opening of the air valve adjusting pipe, for sealing the air valve adjusting pipe by the adjusting bolt; and
a shoulder portion, being disposed at a distal edge of the bottom of the adjusting bolt with the conic structure, the external diameter of the shoulder portion being greater than the diameter of the air flow passage, being latched into the air valve adjusting pipe.

2. The air valve adjusting switch assembly of claim 1, wherein the screw cap is engaged with the screw thread through the thread teeth for adjusting the position of the adjusting bolt in the air valve adjusting pipe to adjust the size of the air flow passage.

3. The air valve adjusting switch assembly of claim 1, wherein the screw cap has a rough surface at an external edge of the screw cap for facilitating the rotation of the screw cap.

4. The air valve adjusting switch assembly of claim 1, wherein the airtight ring is a rubber ring.

5. The air valve adjusting switch assembly of claim 1, wherein the airtight ring is squeezed by the tapered-neck opening and the conic structure to resume its elasticity, if the screw cap is screwed with the air valve adjusting pipe, and the adjusting bolt is sealed into the air valve adjusting pipe.

* * * * *